Nov. 28, 1950 W. B. ENGLER 2,531,771
CLUTCH MECHANISM
Filed Dec. 21, 1945 2 Sheets-Sheet 1
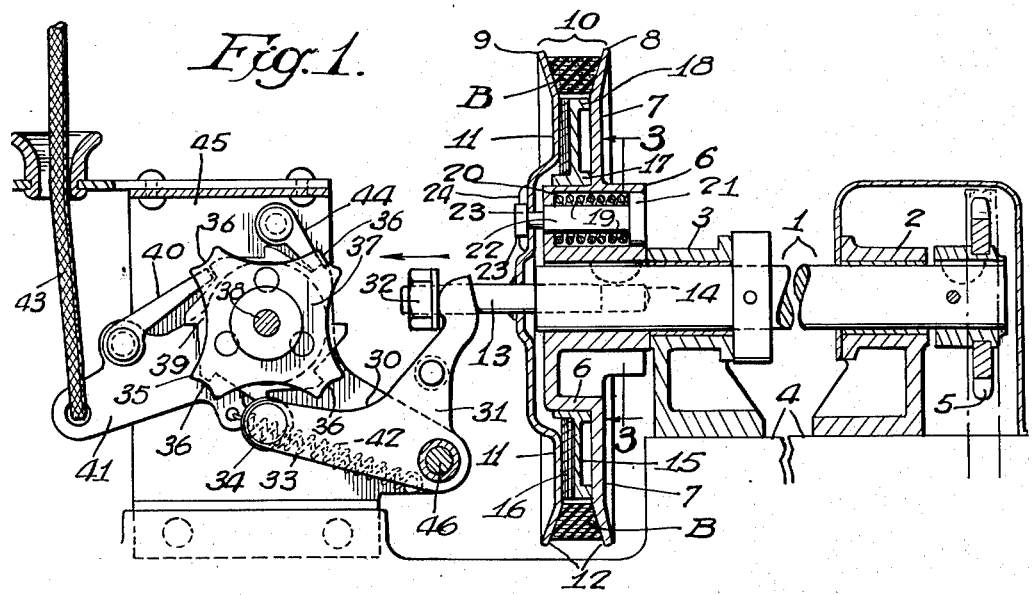
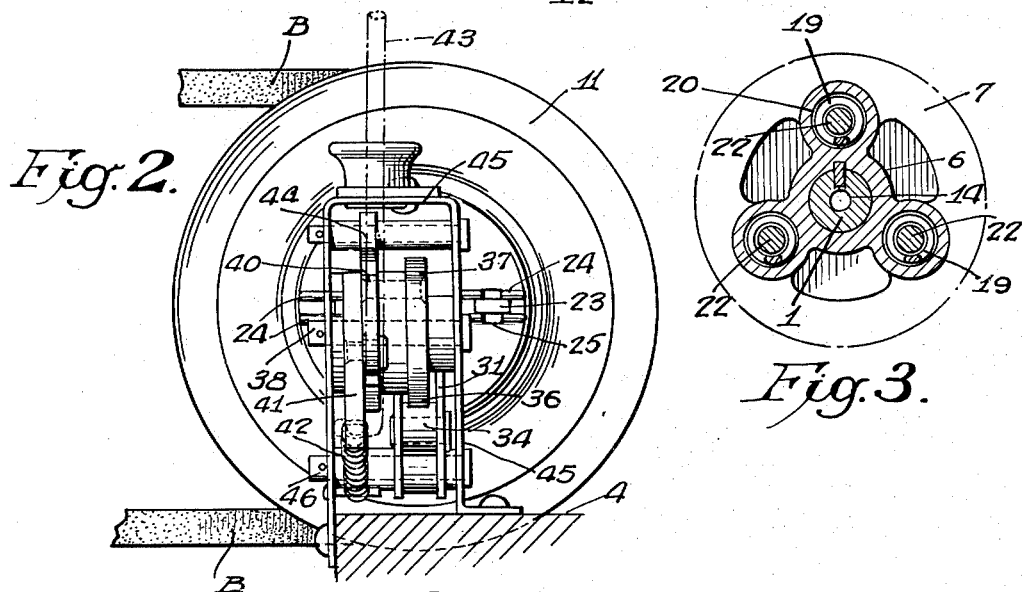
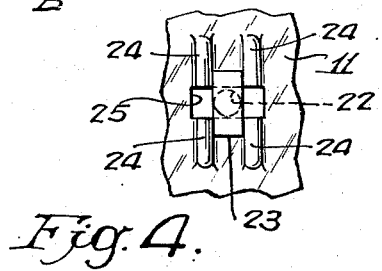
Inventor:
William B. Engler
by his Attorneys
Howson & Howson Nov. 28, 1950 W. B. ENGLER 2,531,771
CLUTCH MECHANISM
Filed Dec. 21, 1945 2 Sheets-Sheet 2
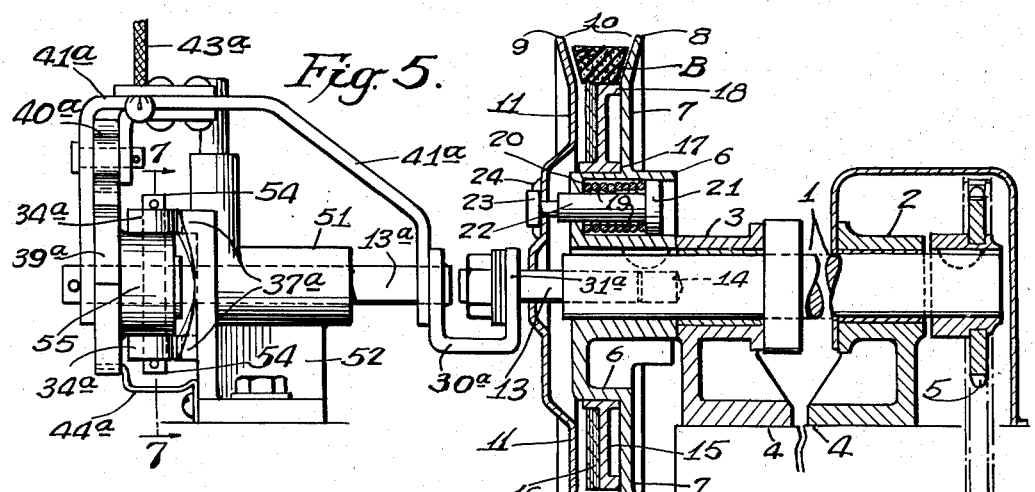
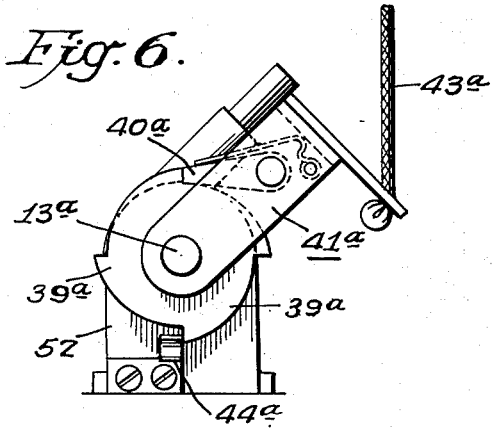
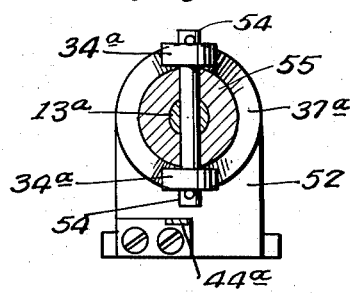
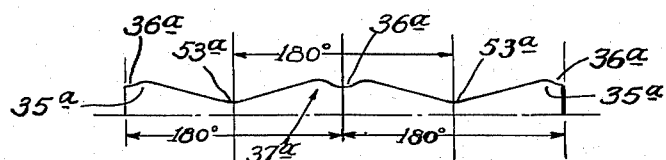
Inventor:
William B. Engler
by his Attorneys
Howson & Howson Patented Nov. 28, 1950

2,531,771

UNITED STATES PATENT OFFICE 2,531,771

CLUTCH MECHANISM

William B. Engler, Green Springs, Ohio

Application December 21, 1945, Serial No. 636,325

5 Claims. (Cl. 74—230.24)

This invention relates to means for transmitting power from a rotating primary or drive shaft, which may constitute the power out-put shaft of any suitable power unit, to a secondary driven shaft, through a suitable transmission mechanism involving the use of a V-shaped belt, with means for controlling the application and release of power to and from the secondary shaft through the V-belt, to rotate and stop the secondary shaft at will.

The device of the present invention is adapted for general application wherever power is to be taken from one shaft and applied to another shaft at regular or irregular intervals; and particularly to the driving of the rotary blade reel, or the traction wheels, or both, of a power lawn mower or similar device, wherein the primary shaft is constantly rotated as a part of or from a suitable mobile source of power, such as a small internal combustion engine or electric motor, and wherein the secondary shaft is rotated only at times selected by the operator to operate said cutting reel or said traction wheels, etc.

In the accompanying drawings:

Fig. 1 is a longitudinal sectional elevation of one form of the device constructed and adapted to operate in accordance with the principles of the present invention;

Fig. 2 is an end view;

Fig. 3 is a transverse section taken on the line 3—3, Fig. 1;

Fig. 4 illustrates a detail of the structure shown in Fig. 1;

Fig. 5 is a view similar to Fig. 1 but showing a modified form of control unit;

Fig. 6 is an end view of the structure shown in Fig. 5;

Fig. 7 is a transverse section taken on the line 7—7, Fig. 5; and

Fig. 8 is a circumferential flat development of the control cam of Fig. 5.

As shown in Figs. 1 and 5, a secondary shaft I is rotatably mounted in suitable fixed bearings 2 and 3. The bearings 2 and 3 are adapted to be secured to any suitable base 4, such, for example, as the frame of a lawn mower.

The shaft I, in the present instance, is shown as being provided with a driving wheel 10 which is adapted to be driven by a V-belt B from the power out-put shaft (not shown) of any suitable power unit, such as a light internal combustion engine or electric motor which could be readily mounted on the base or frame 4.

The shaft I is also provided with a sprocket wheel 5, or any suitable equivalent means, for connecting the shaft I to the traction wheels or blade reel of a lawn mower, for example.

Keyed to the shaft I is a drum-like element 6 which is provided with a disc-like flange 7 having an outer peripheral marginal area 8 forming a beveled edge on the disc 7. The disc 7 forms one part of the driving wheel 10, which in the present instance, is in the form of a grooved faced pulley, the second part of which is formed of a disc 11 having a beveled marginal outer edge 9 flaring oppositely to the marginal edge 8 of the disc 7 and collectively therewith forming a V-shape peripheral groove 12 in the pulley 10 for the reception of a drive belt B of V-shaped cross section.

The V-belt B is adapted to apply the power to the shaft I, through the grooved faced pulley 10 for transmission to another shaft (not shown) such as the blade reel shaft of a lawn mower, through the sprocket 5.

The disc 11 is concentric to the disc 7 and the shaft I, and is secured to a short stud or rod 13 having one end mounted and slidable axially in an axial bore 14 formed in one end of the shaft I.

Rotatably mounted for free rotation on and with respect to the peripheral face of the drum 6, adjacent the disc 7, is a plain faced idler wheel 15, and a series of loose, freely rotatable shim plates in the form of plain discs 16. The idler wheel 15 includes a hub 17 and a rim rib 18 adapted to bear against one side face of the pulley disc 7. The shim discs 16 are interposed between the opposite plain flat side face of the idler wheel 15 and the similar flat plain inner face of the pulley disc 11.

The peripheral face of the idler wheel 15 and the corresponding peripheral edges of the shim discs 16, collectively, constitute the annular base surface of the belt groove 12 in the pulley 10; and the collective axial thicknesses of the wheel 15 and shims 16 provide the proper width and depth of V-shaped groove 12 in the pulley 10 for frictionally engaging the converging side faces of the V-belt B, by and between the flaring marginal surfaces 8 and 9 of the pulley discs 7 and 11, in a manner which is normal in V-belt transmissions. By adding or subtracting discs 16, 16, the width of the V-shaped groove 12 can be controlled for properly engaging the angular sides of a new V-belt B, or of a V-belt whose side faces have worn away to an extent which would permit the smaller face of the belt to engage the base surface of the pulley groove and cause slippage to occur between the pulley 10 and the V-belt B.

The pulley disc 11, the shim discs 16, the idler wheel 15, and the pulley disc 7 are drawn axially into firm successive abutting relation to each other by a series of springs 19, 19, which are individually mounted in recesses 20, 20, formed in the drum 6. The springs 19, 19 are disposed on and between the circular heads 21, 21 of a series of bolts 22, 22 and the base surfaces of said recesses 20, 20, through which the bolts 22, 22 pass and are secured at their opposite ends to the pulley disc 11.

These opposite ends of the bolts 22, 22 are provided with T-shaped heads 23, 23 (see Fig. 4), which lie between ribs 24, 24 formed on the outer side face of the pulley disc 11 to keep said bolts from turning. The bolts 22, 22 may be withdrawn by pushing said bolts axially against the action of the springs 19, 19 until the inner surfaces of the heads 23, 23 are disposed outside the plane of the outer faces of the ribs 24, 24, whereupon the bolts 22, 22, may be turned 90° until the rectangular heads 23 line up with corresponding rectangular openings 25, 25 formed in the pulley disc 11. The bolts 22 are installed and locked in place by reversing this course of procedure.

Obviously, by pulling the stud or pull-rod 13 outwardly, as indicated by the arrow in Fig. 1, the beveled marginal area 9 of the pulley disc 11 is moved away from the opposed beveled marginal area 8 of the pulley disc 7 and releases the belt B from lateral frictional contact with said marginal areas of said pulley discs, whereupon the belt B will drop freely onto the base of the belt groove 12 as formed by the peripheral face of the idler wheel 15 and the peripheral edges of the shim discs 16. Having been released by separation of the pulley discs 7 and 11, the idler wheel 15 and shim discs 16, 16 are now free to revolve freely on and with respect to the drum 6 and support the released belt B, while the drum 6 and shaft 1 stand idle.

As shown in Fig. 1, the pulling of the rod 13, to release the belt B, is accomplished by a bellcrank lever 30, one arm 31 of which is bifurcated to span the rod 13 and to engage a collar 32 on the rod 13, at opposite sides respectively thereof.

The second arm 33 of the bell-crank lever 30 is provided with a roller 34 which is adapted to be engaged successively by cam lobes 35, 35, each of which has its outer end concaved, as at 36, to receive and hold the roller 34, and consequently the bell-crank lever 33, in a position where the pulley discs 7 and 11 are maintained in spaced relation, with the belt B released from the pulley 10 thereby.

The lobes 35, 35 constitute parts of a cam 37 which is adapted to be rotated about the axis of a pivot pin 38 together with, and by a ratchet wheel 39, to which the cam 37 is secured.

The ratchet wheel 39 is operated intermittently by a pawl 40 on a lever 41. The lever 41 is adapted to be rocked about the axis of the pivot pin 38, against the action of a return spring 42, by a rope or other flexible element 43 which passes to a place convenient to the operator of the apparatus of which the control mechanism of the present invention forms a part.

Back lash of the ratchet wheel 39 is prevented by a pawl 44 which engages the ratchet wheel 39 and is carried by a fixed frame 45, which also supports the pivot pin 38 for the cam 37 and the ratchet wheel 39, and also the pivot pin 46 of the bell-crank lever 30.

As shown in Fig. 5, the operating stud or pullrod 13, is connected by a U-shaped element 30a having one leg or arm 31a bifurcated to receive the pull-rod 13, behind the collar 32 thereon. The second leg of the U-shaped element 30a is adapted to be secured to an axially aligned supplementary pull-rod 13a which is rotatably and slidably mounted in a bearing 51 forming part of a bracket 52.

Secured to the pull-rod 13a is a ratchet wheel 39a which is engageable by a pawl 40a carried by a lever 41a, said lever 41a being rotatably mounted on the pull-rod 13a and operable by a pull cord 43a.

On one end face of the bracket 52, surrounding the pull-rod 13a, is formed an annular cam 37a (see Fig. 7). This cam 37a includes diametrically opposite high spots or lobes 35a, 35a, with concave holding faces 36a, 36a, and intermediate low spots 53a, 53a.

The high spots or lobes 35a, 35a, of the cam 37a are adapted to be engaged simultaneously by cam followers, in the form of rollers 34a, 34a. These cam followers are rotatably mounted on pivot studs 54, 54 projecting radially from the hub 55 of the ratchet wheel 39a.

An anti-back-lash pawl 44a, in the form of a flat spring, is secured to the bracket 52 and is engaged by the ratchet wheel 39a.

In either instance, Fig. 1 or Fig. 5, pulling on the operating cord 43 or 43a will rock the pawl carrying lever 41 or 41a and turn the ratchet wheel 39 or 39a and their respective cams 37 or 37a, to operate the pull-rods 13 and thereby separate the pulley discs 7 and 11 for releasing the belt B. In each instance a predetermined angular movement of the ratchet wheels or their cam followers, together with their respective cams will release the pull-rod 13 and permit the springs 19 to reestablish the belt gripping contact of the pulley wheel discs 7 and 11, whereby power will be transmitted to the shaft 1 by the belt B, from another shaft or other constantly rotating source of power (not shown).

By releasing the bolts 22, 22, from the pulley disc 11, as hereinbefore described, and by releasing the pull rod 13 from the bifurcated arm 31 or 31a, as the case may be, the disc 11 may be completely removed to provide for replacement of the belt B or to add or subtract shim discs 16 without otherwise disturbing any of the other parts of the mechanism.

I claim:

1. A control apparatus for a V belt power transmitting mechanism comprising a pair of axially aligned and relatively movable pulley members, means for relatively moving said members toward each other to grip opposite side faces respectively of the V belt, means for relatively moving said members apart to release said belt, and means freely rotatable intermediate said members to support said belt when so released including a plurality of discs which may be increased and decreased in number to effect proper engagement of the pulley members with said belt.

2. A control apparatus for a V belt power transmitting mechanism comprising a pair of axially aligned and relatively movable pulley members, means for relatively moving said members toward each other to grip opposite side faces respectively of the V belt, cam means for relatively moving said members apart to release said belt, means freely rotatable intermediate said members to support said belt when so released and spacer means carried by the last mentioned means comprising a plurality of discs which may be increased and decreased in number at will to effect proper engagement of the belt by said pulley members.

3. A control apparatus for a V belt power transmitting mechanism comprising a pair of axially aligned and relatively movable pulley members, a drum forming part of one of said members, spring means mounted in said drum and connected to the other of said members to effect gripping of opposite side faces respectively of a V belt by and between said members, means for separating said members to release said belt, and means rotatable on said drum intermediate said members for supporting the belt when released.

4. Control apparatus as claimed in claim 3 wherein spacer means is provided intermediate said pulley members to effect proper engagement of the belt by said pulley members.

5. Control apparatus as claimed in claim 3 wherein the means rotatable on the drum for supporting the belt when released includes a plurality of discs which may be increased and decreased in number to effect proper engagement of the belt by said pulley members.

WILLIAM B. ENGLER.

REFERENCES CITED

The following references are of record in the file of this patent:

UNITED STATES PATENTS

| Number | Name | Date |
| --- | --- | --- |
| 1,740,087 | Hall | Dec. 17, 1929 |
| 2,165,431 | Wellman | July 11, 1939 |

FOREIGN PATENTS

| Number | Country | Date |
| --- | --- | --- |
| 19,697 | Great Britain | Sept. 19, 1908 |
| 3,710 | Great Britain | 1909 |
| 104,355 | Australia | July 7, 1938 |